United States Patent [19]

Ullrich et al.

[11] Patent Number: 5,445,049
[45] Date of Patent: Aug. 29, 1995

[54] TORSIONAL VIBRATION DAMPER

[75] Inventors: Günter Ullrich, Hemsbach; Herwig Hönlinger, Gross-Rohrheim; Uwe Henrich, Otzberg, all of Germany

[73] Assignee: Firma Carl Freudenberg, Weinheim, Germany

[21] Appl. No.: 249,009

[22] Filed: May 25, 1994

[30] Foreign Application Priority Data

Sep. 6, 1993 [DE] Germany ............... 43 19 168.1

[51] Int. Cl.[6] .................................. F16F 15/10
[52] U.S. Cl. ........................ 74/574; 267/141.3; 267/292; 267/154; 464/17
[58] Field of Search .......... 188/279, 281, 282, 292; 267/141.2, 141.3, 141.4, 292; 384/220; 74/574; 474/94; 464/83, 180

[56] References Cited

U.S. PATENT DOCUMENTS

| | | | |
|---|---|---|---|
| 4,002,081 | 1/1977 | Schultz, Jr. ............... | 474/94 |
| 4,077,233 | 3/1978 | Hornig et al. ............ | 74/574 |
| 4,114,472 | 9/1978 | Hornig et al. ............ | 74/574 |
| 4,293,136 | 10/1981 | George .................... | 74/574 |
| 4,380,442 | 4/1983 | Amsel ..................... | 74/574 |
| 4,516,955 | 5/1985 | Wörner et al. ........... | 74/574 |
| 4,680,984 | 7/1987 | Wähling et al. .......... | 74/574 |
| 4,734,079 | 3/1988 | Viets ....................... | 74/574 |
| 4,781,659 | 11/1988 | Gebhardt ................. | 474/94 |
| 4,815,332 | 3/1989 | Serizawa et al. ......... | 74/574 |

FOREIGN PATENT DOCUMENTS

| | | | |
|---|---|---|---|
| 218774 | 2/1986 | European Pat. Off. | |
| 3424575 | 1/1986 | Germany ................. | 74/574 |

*Primary Examiner*—Robert J. Oberleitner
*Assistant Examiner*—Chris Schwartz
*Attorney, Agent, or Firm*—Kenyon & Kenyon

[57] ABSTRACT

A torsional vibration damper having a substantially cup-shaped hub ring made from deep drawn sheet metal. The base of the hub ring has at least one orifice for mounting the damper to a machine part subject to torsional vibrations, the hub ring being joined by at least one spring element made of an elastomeric material - in a manner allowing relative rotation - to at least one inertial ring. The base is provided with an annular centering collar, extending in the axial direction, which fits around the outer periphery of the machine part in partial contact. The centering collar and the base are configured integrally and continuously with one another.

10 Claims, 4 Drawing Sheets

TORSIONAL VIBRATION DAMPER

BACKGROUND OF THE INVENTION

1. Field of the Invention

The present invention concerns a torsional vibration damper. The torsional vibration damper includes a substantially cup-shaped hub ring made from deep drawn sheet metal, the base of which has at least one orifice for mounting to a machine part subject to torsional vibrations. The hub ring is joined to at least one inertial ring by at least one spring element made of an elastomeric material, in a manner allowing relative rotation between the hub ring and the inertial ring.

2. Description of Related Art

A torsional vibration damper is known from EPO Application 0 218 774. In the device shown in that application, centering of the hub ring on the machine part is achieved only by either having a stub shaft of the machine part pass through a central opening of the hub ring - requiring both parts being made to close tolerances - or by using dowel bolts for mounting the hub ring on the machine part. It is disadvantageous in a device of this construction that the orifices in the base of the hub ring and the holes in the machine part must be made to particularly close tolerances. The need for such close tolerancing is economically unsatisfactory. It is also difficult to engineer and fabricate a hub ring out of deep drawn sheet metal with sufficiently tight tolerances for the kind of connection shown in this known device.

SUMMARY OF THE INVENTION

The underlying object of the present invention is to provide a torsional vibration damper so as to allow simplified mounting to a machine part that is subject to torsional vibrations.

To achieve the object of the present invention, provision is made for the base to include an annular centering collar, extending in the axial direction, which fits around the outer periphery of the machine part and is in partial contact with the machine part. The centering collar and the base are configured integrally and continuously with one another. This design is advantageous because of the design of the centering collar, whereby the torsional vibration damper can be fixed perfectly in position with respect to the machine part by simple bolts, even when the machine part has a flat end surface with no stub shaft. Mounting the present invention onto end surfaces of a machine part having an outside diameter that is almost exactly the same size as the inside diameter of the hub ring presents no problems. The annular centering collar, which extends in the axial direction, is machined on the inner periphery of the hub ring in such a way that it has the tolerances required for centering, and can be slid onto the outer periphery of the machine part. Centering by means of mounting screws is not required in the device of the present invention, making the device more economical to manufacture. Moreover, a hub ring of this type is comparatively easy to produce, since the centering collar and the base are configured integrally and continuously with one another. A hub ring made of deep drawn sheet metal is advantageous in particular for applications in which a particularly small inertial mass is required, so that changes in rotational speed can be made as quickly as possible. A ring of this type has a much smaller mass than a cast hub ring.

The centering collar of the present invention can consist of at least two retaining prongs, distributed regularly on the periphery of the hub ring and reshaped out from the base. Preferably at least three retaining prongs are used, which are distributed regularly around the periphery and are used in order to ensure good support of the torsional vibration damper on the machine part. Depending on the circumstances in which the present invention is used, the retaining prongs can be reshaped out axially on either side of the base of the hub ring. If the retaining prongs are, for example, arranged so that they lie inside the hub ring and are enclosed by it, the torsional vibration damper encloses the shaft end of the machine part. In an embodiment of the preceding configuration, the total axial extension of the device is particularly small. In another embodiment of the present invention, the centering collar can extend in the axial direction opposite the retaining surfaces of the hub ring.

The openings formed by creation of the retaining prongs can be closed off by seals made of an elastomeric material, the seals and the spring element being configured integrally and continuously with one another. The elastomeric material of the seals preferably extends annularly between the prongs. It is advantageous if the hub ring is mounted to the machine part in a manner impervious to dust and liquids. Components adjacent one another in the axial direction, for example a radial shaft seal arranged on the machine part, can thereby be protected from contaminants. The seals and the spring element are joined to one another by a rubber spillover, and thus can be produced particularly easily and cost-effectively.

The inertial ring of the present invention can be configured, for example, as a belt pulley, on which at least one belt is guided to drive accessories.

The centering collar of the present invention is produced in the following manner. In a first process step, an initially flat disk is converted into the cup-shaped form of the hub ring, and in the second step the retaining prongs are stamped out of the flat base and reshaped in the axial direction. The first and second steps in the production of the hub ring can occur in a single tool, making the torsional vibration damper of the present invention economical to produce. The spring element can be held, in an attached or unattached manner, inside the radial gap between the hub and inertial rings.

BRIEF DESCRIPTION OF THE DRAWINGS

The torsional vibration damper according to the invention is explained below in greater detail with reference to the attached drawings, in which.

DETAILED DESCRIPTION OF THE DRAWINGS

Figure 1:
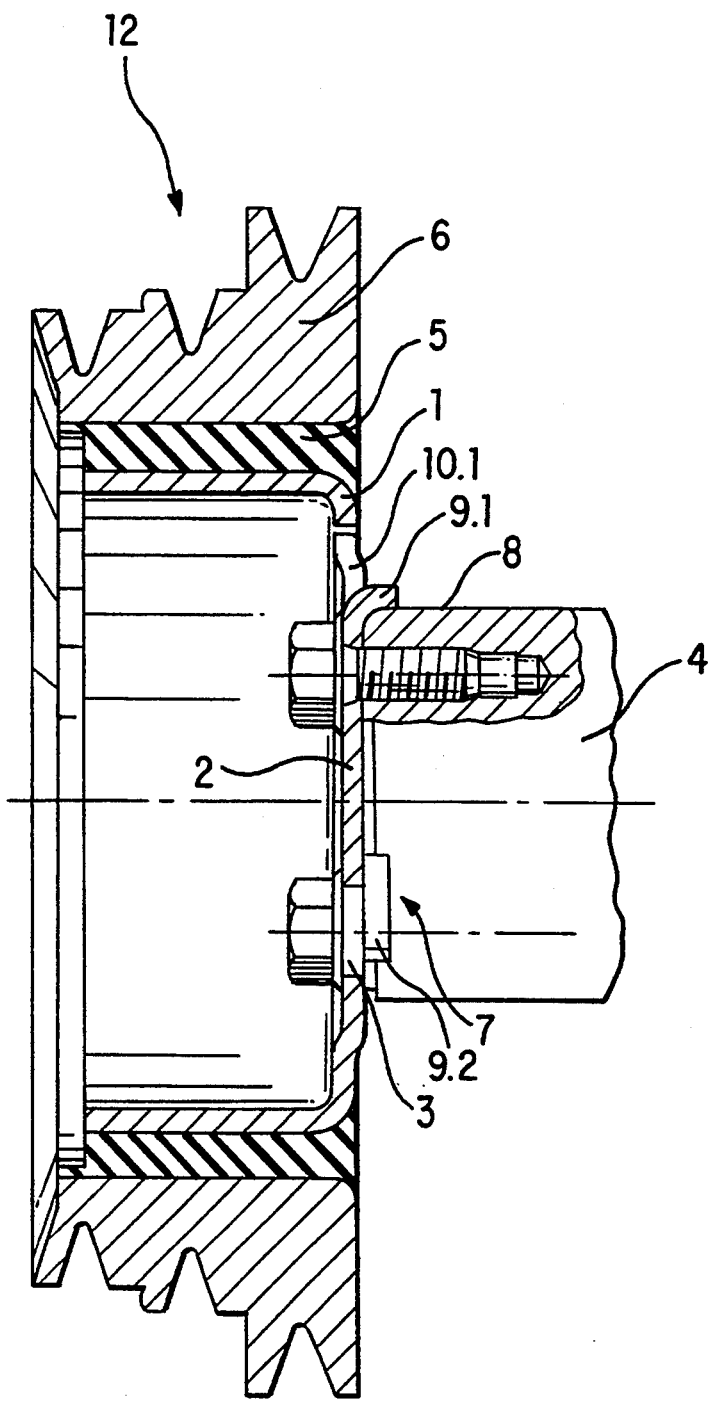
FIG. 1 shows a first exemplary embodiment of the torsional vibration damper of the present invention, which comprises an inertial ring configured as a belt pulley and capable of receiving a plurality of belts.

FIG. 1 shows a first exemplary embodiment of a torsional vibration damper that consists of a hub ring 1 and an inertial ring 6 that are joined by a spring element 5 made of an elastomeric material in a manner allowing relative rotation between the hub ring 1 and the inertial ring 6. Hub ring 1 is cup-shaped and is made of a deep drawn sheet of metal that, in the exemplary embodiment, has a preferred thickness of 2 to 6 min. Base 2 of hub ring 1 is provided with an integrally formed centering collar 7 that fits over the outer periphery 8 of machine part 4 - which in the exemplary embodiment is configured as the crankshaft of a motor vehicle. Centering collar 7 consists of three retaining prongs 9.1, 9.2, 9.3 distributed regularly in the peripheral direction, which are reshaped out of base 2. The outside diameter of machine part 4 is small in comparison with the inside diameter of the hub ring, and the end surface of the machine part 4 is flat. The end surface of machine part 4 is in planar contact with base 2 of the hub ring. Because of the configuration of the centering collar, it is easy in terms of cost and production engineering to center the torsional vibration damper relative to machine part 4. In this exemplary embodiment, inertial ring 6 is configured as a triple belt pulley 12, provided with graduated diameters. Retaining prongs 9.1, 9.2, 9.3, which are reshaped out of base 2, form openings 10.1, 10.2, 10.3, that in the exemplary embodiment of FIG. 1 are open.

Figure 2:
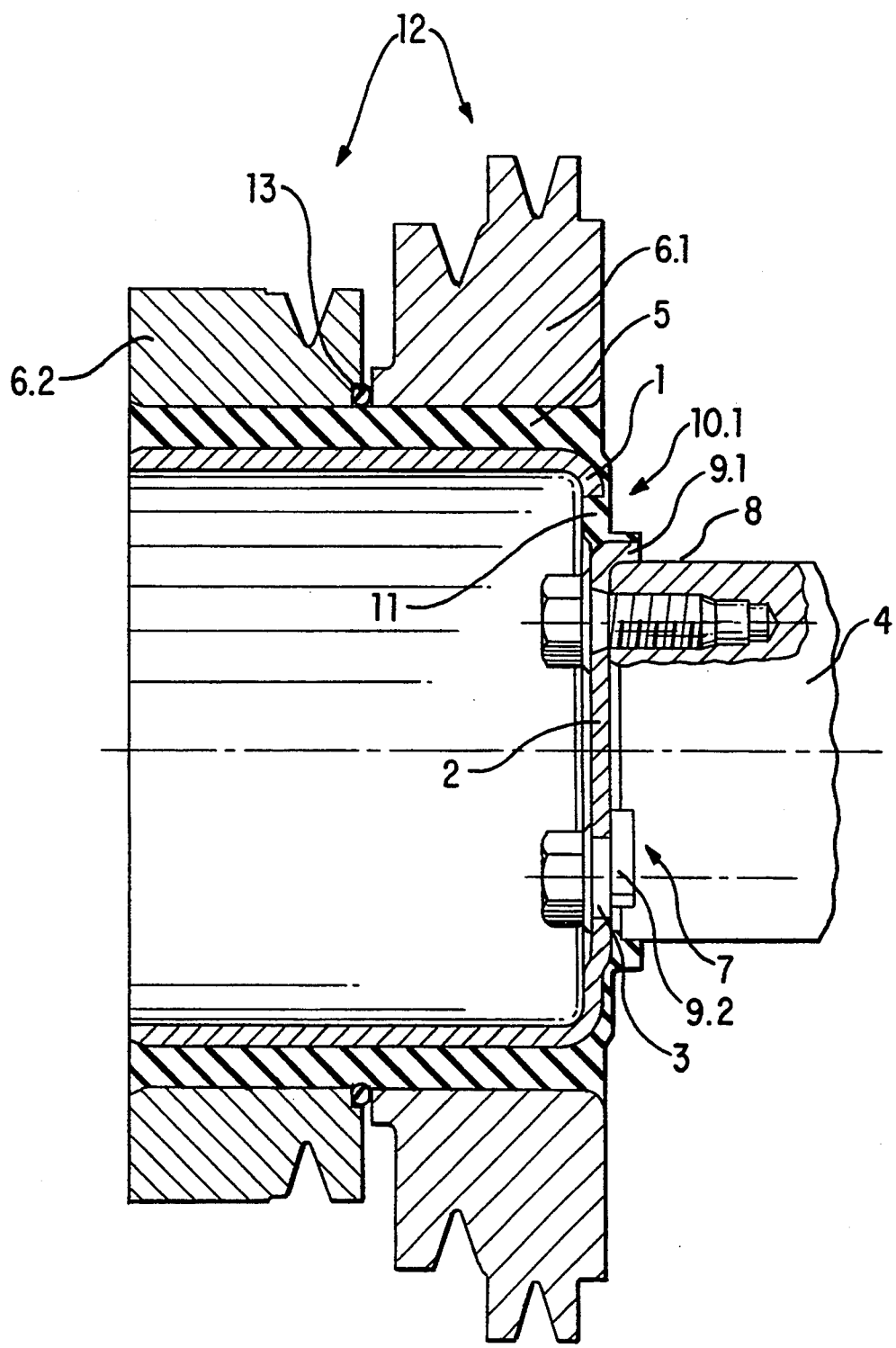
FIG. 2 shows a second exemplary embodiment of the present invention in which two axially adjacent inertial rings are used, each embodied as a belt pulley.

FIG. 2 shows a second exemplary embodiment of a torsional vibration damper of the present invention, similar to the torsional vibration damper of FIG. 1. In contrast, the inertial ring in FIG. 2 is configured in two parts - 6.1 and 6.2 - each inertial ring 6.1, 6.2 being configured as a belt pulley 12. The two inertial rings 6.1, 6.2 are located adjacent to and spaced apart from one another in the axial direction. The end surfaces of inertial rings 6.1, 6.2 which face one another are supported axially against one another by a sliding ring 13. Sliding ring 13 is preferably made of a polymeric material, for example polytetrafluoroethylene. Because of the good frictional characteristics of sliding ring 13, the two inertial rings 6.1, 6.2 - which have masses different from one another in order to damp vibrations across a wide frequency range - are mounted so as to rotate relative to one another. One inertial ring 6.1 contacts sliding ring 13 with a flat end surface, while the other inertial ring 6.2 contacts the sliding ring in the region of its axial and radial delimiting surface. Sliding ring 13 encloses spring element 5 peripherally with a radial preload.

To prevent contaminants from penetrating through openings 10.1, 10.2, 10.3, which result from the production of retaining prongs 9.1, 9.2, 9.3, in this exemplary embodiment openings 10.1, 10.2, 10.3 are closed off by seals 11 that are configured integrally and continuously with spring element 5. Integral joining of seals 11 and spring element 5 is effected by a rubber spillover. In this exemplary embodiment, retaining prongs 9.1, 9.2, 9.3 enclose outer periphery 8 of machine part 4 and are in contact therewith. The torsional vibration damper of the present invention is preferably retained on outer periphery 8 of the machine part by means of an H7/H8 transition fit.

Figure 3:
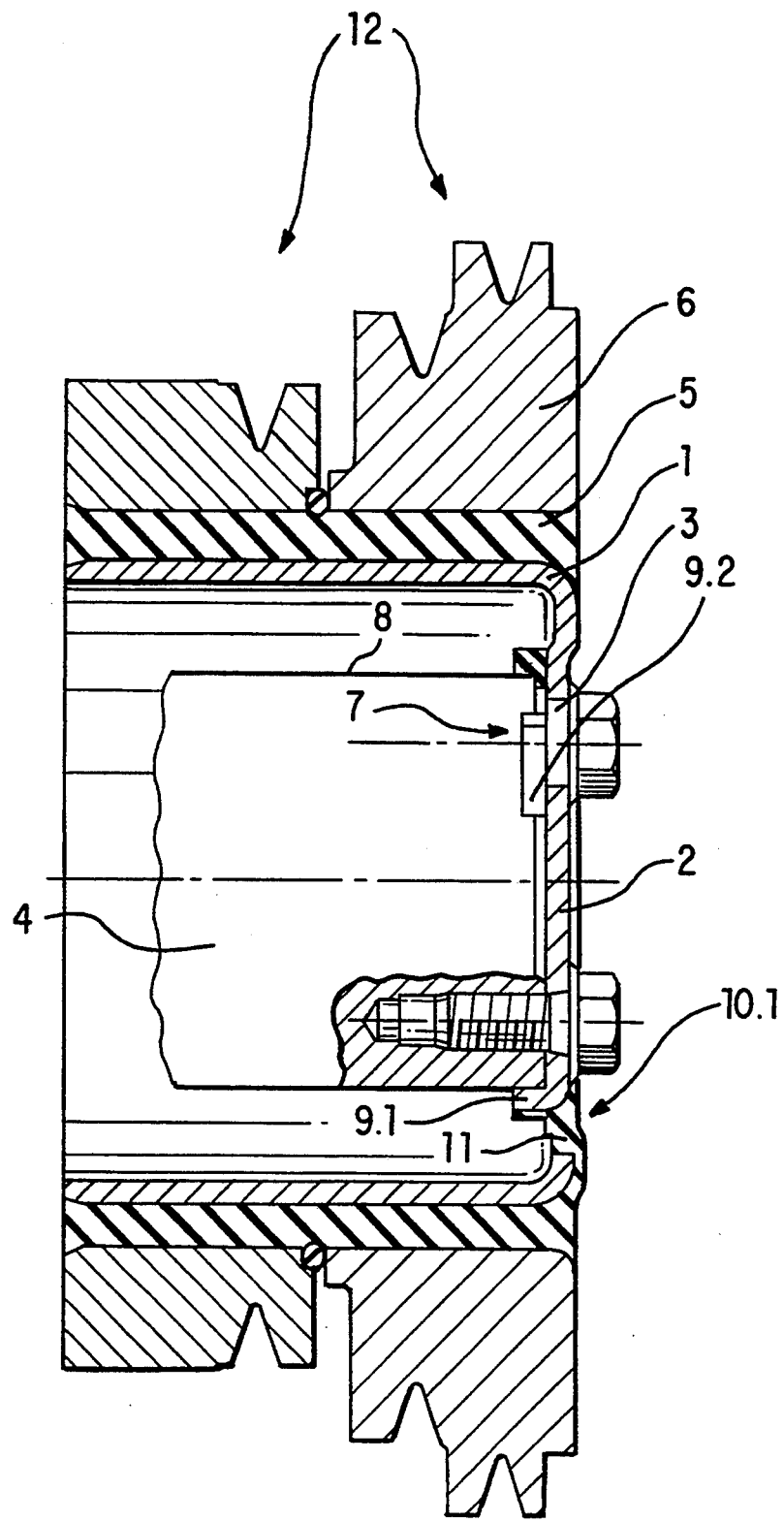
FIG. 3 shows a third exemplary embodiment similar to the exemplary embodiment of FIG. 2, in which the torsional vibration damper fits over the shaft end to reduce bending torque and axial extension.

FIG. 3 shows a third exemplary embodiment similar to the exemplary embodiment of FIG. 2, in which the torsional vibration damper encloses the end of machine part 4, with radial spacing between the two. Bending stresses in machine part 4 and the total axial extent of the damper can be reduced by this configuration.

Figure 4:
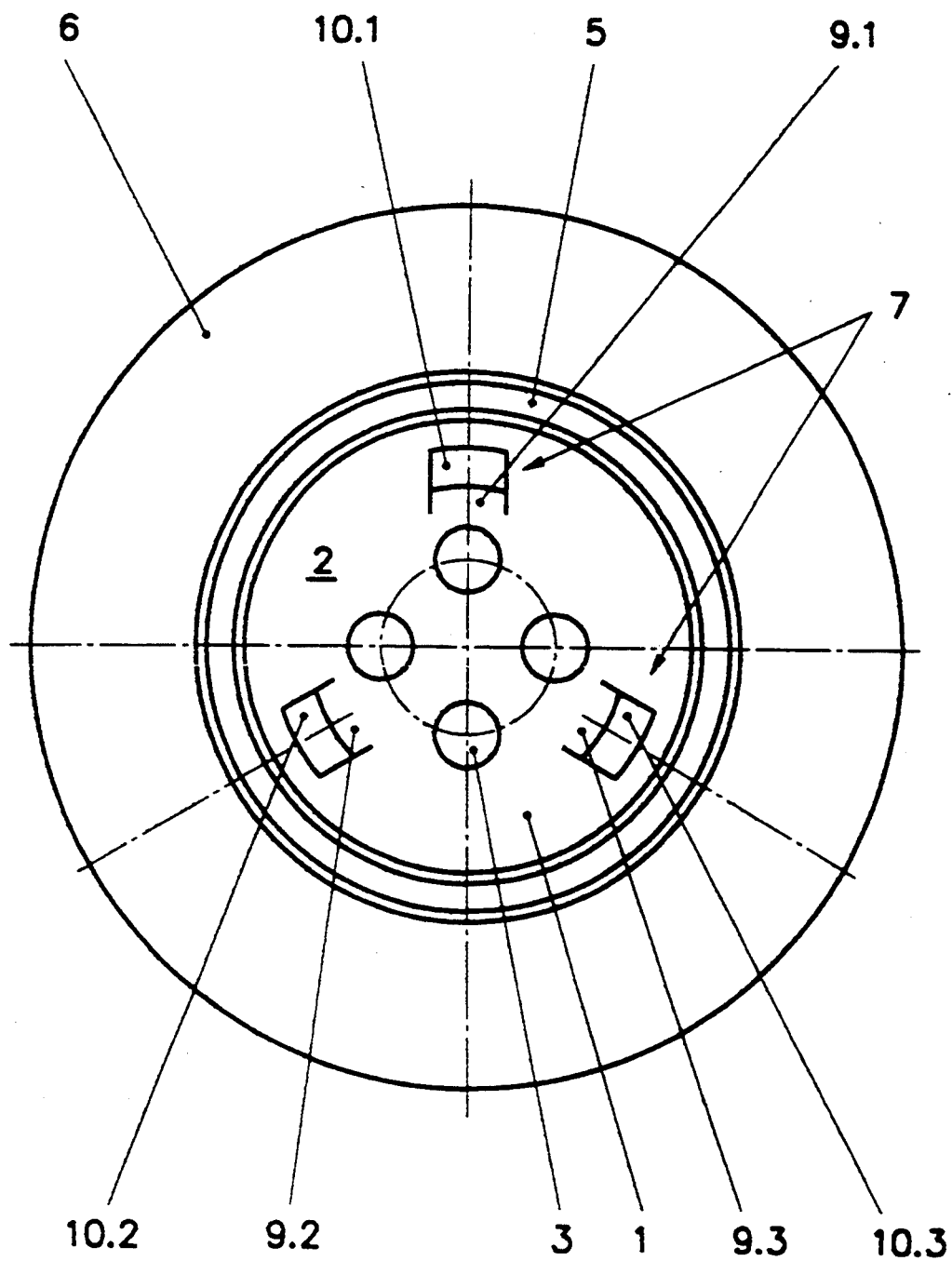
FIG. 4 shows an end view of the torsional vibration damper of FIG. 1.

FIG. 4 shows an end view of the torsional vibration damper of FIG. 1. Base 2 of hub ring 1 is provided with four orifices 3 distributed regularly in the peripheral direction, through which mounting bolts pass in order to mount the torsional vibration damper to machine part 4 shown in FIG. 1. In addition, three retaining prongs 9.1, 9.2, 9.3, distributed regularly in the peripheral direction, are provided, forming centering collar 7 with which the torsional vibration damper is placed on the outer periphery of machine part 4. Hub ring 1 is surrounded by a spring element 5 that is adhesively fixed in a gap delimited by hub .ring 1 and inertial ring 6.

We claim:

1. A torsional vibration damper for a machine part subject to torsional vibrations, said damper comprising:
   a substantially cup-shaped hub ring made from deep drawn sheet metal, said hub ring comprising a base having at least one orifice shaped for mounting said damper to said machine part, said base further comprising an annular centering collar comprising at least two retaining prongs extending in an axial direction from said base, said annular centering collar shaped so as to fit around an outer periphery of said machine part, said centering collar and said base being formed integrally with one another;
   at least one spring element made of an elastomeric material; and
   at least one inertial ring, said hub ring being joined by said at least one spring element to said inertial ring in a manner allowing relative rotation between said inertial ring and said hub ring.

2. The torsional vibration damper of claim 1, wherein:
   said at least two retaining prongs are distributed regularly in a circumferential direction, said retaining prongs being stamped out of said base.

3. The torsional vibration damper of claim 1, wherein:
   said inertial ring is a belt pulley.

4. A torsional vibration damping apparatus, said apparatus comprising:
   a machine part subject to torsional vibrations;
   a substantially cup-shaped hub ring made from deep drawn sheet metal, said hub ring comprising a base having at least one orifice, said base further comprising an annular centering collar comprising at least two retaining prongs extending in an axial direction from said base, said annular centering collar fitting around, and in partial. contact with, an outer circumference of said machine part, said centering collar and said base being formed integrally with one another;
   a fastening device extending through said orifice and fastening said machine part to said base;
   at least one spring element made of an elastomeric material; and
   at least one inertial ring, said hub ring being joined by said at least one spring element to said inertial ring in a manner allowing relative rotation between said inertial ring and said hub ring.

5. The torsional vibration damping apparatus of claim 4, wherein:
   said at least two retaining prongs are distributed regularly in a circumferential direction, said retaining prongs being stamped out of said base.

6. The torsional vibration damping apparatus of claim 5, further comprising:
openings formed in said base by creation of said retaining prongs, said openings being closed off by seals made of an elastomeric material, and wherein said seals and said at least one spring element are formed integrally with one another.

7. The torsional vibration damping apparatus of claim 4, wherein:
said inertial ring is a belt pulley.

8. The torsional vibration damping apparatus of claim 4, wherein:
said inertial ring comprises two parts, said two parts being separated by a sliding ring, said sliding ring allowing relative rotation between said two parts.

9. A torsional vibration damper for a machine part subject to torsional vibrations, said damper comprising:
a substantially cup-shaped hub ring made from deep drawn sheet metal, said hub ring comprising a base having at least one orifice shaped for mounting said damper to said machine part, said base further comprising an annular centering collar comprising at least two retaining prongs extending in an axial direction, said annular centering collar being shaped so as to fit around an outer periphery of said machine part, said centering collar and said base being formed integrally with one another, said at least two retaining prongs being distributed regularly in a circumferential direction, said retaining prongs being stamped out of said base, said base comprising openings formed in said base by creation of said retaining prongs, said openings being closed off by seals made of an elastomeric material, and wherein said seals and said at least one spring element are formed integrally with one another;
at least one spring element made of an elastomeric material; and
at least one inertial ring, said hub ring being joined by said at least one spring element to said inertial ring in a manner allowing relative rotation between said inertial ring and said hub ring.

10. A torsional vibration damper for a machine part subject to torsional vibrations, said damper comprising:
a substantially cup-shaped hub ring made from deep drawn sheet metal, said hub ring comprising a base having at least one orifice shaped for mounting said damper to said machine part, said base further comprising an annular centering collar comprising at least two retaining prongs extending in an axial direction; said annular centering collar shaped so as to fit around an outer periphery of said machine part, said centering collar and said base being formed integrally with one another;
at least one spring element made of an elastomeric material; and
at least one inertial ring, said hub ring being joined by said at least one spring element to said inertial ring in a manner allowing relative rotation between said inertial ring and said hub ring, said inertial ring comprising two parts, said two parts being separated by a sliding ring, said sliding ring allowing relative rotation between said two parts.

* * * * *

UNITED STATES PATENT AND TRADEMARK OFFICE
CERTIFICATE OF CORRECTION

PATENT No. : 5,445,049

DATED : August 29, 1995

INVENTOR(S): ULRICH, et al.

It is certified that error appears in the above-identified patent and that said Letters Patent is hereby corrected as shown below:

Column 3, line 11, "min" should be --mm--.

Signed and Sealed this

Seventh Day of May, 1996

Attest:

BRUCE LEHMAN

*Attesting Officer*  *Commissioner of Patents and Trademarks*